United States Patent [19]
Erb et al.

[11] Patent Number: 4,983,203
[45] Date of Patent: Jan. 8, 1991

[54] COOLING DEVICE FOR GLASS CONTAINER FORMING MACHINE

[75] Inventors: Roger Erb; Robert Johnson, both of Marion; Richard Smith, Uplant, all of Ind.

[73] Assignee: American National Can Company, Chicago, Ill.

[21] Appl. No.: 466,209

[22] Filed: Jan. 17, 1990

[51] Int. Cl.$^5$ ............................................. C03B 9/38
[52] U.S. Cl. ...................................... 65/265; 65/267; 65/319; 65/356
[58] Field of Search ................. 65/265, 267, 319, 355, 65/356, 103, 137

[56] References Cited

U.S. PATENT DOCUMENTS

| | | | |
|---|---|---|---|
| 4,009,018 | 2/1977 | Nebelung et al. | 65/229 |
| 4,070,174 | 1/1978 | Nebelung et al. | 65/229 |
| 4,361,434 | 11/1982 | Schneider | 65/355 X |
| 4,579,576 | 4/1986 | Jones | 65/265 |
| 4,690,703 | 9/1987 | Kulig | 65/265 |
| 4,701,202 | 10/1987 | Foster | 65/265 |
| 4,701,203 | 10/1987 | Schneider | 65/265 |
| 4,750,929 | 6/1988 | Bolin | 65/265 |
| 4,842,637 | 6/1989 | Bolin et al. | 65/356 X |

FOREIGN PATENT DOCUMENTS

| | | |
|---|---|---|
| 102820 | 2/1986 | European Pat. Off. |
| 8225188 | 9/1982 | United Kingdom |
| 8307462 | 3/1983 | United Kingdom |

Primary Examiner—Robert L. Lindsay
Attorney, Agent, or Firm—Robert A. Stenzel; Daniel N. Christus

[57] ABSTRACT

An air cooling mechanism for a machine for molding glass objects from molten glass. The mechanism comprises a mold (14) including mold halves each having a plurality of air passages (20). A fixed plenum (22) includes a slot (24) for the passage of air from that plenum into the air passages of that mold half. Pivot means (26) are provided for pivoting the mold halves from a first position where the mold defines an article cavity, to a second position away from the article to be molded. In this second position, one end of the air passages are in registry with the slot to effect the transport of air from the plenum and through the air passages.

11 Claims, 4 Drawing Sheets

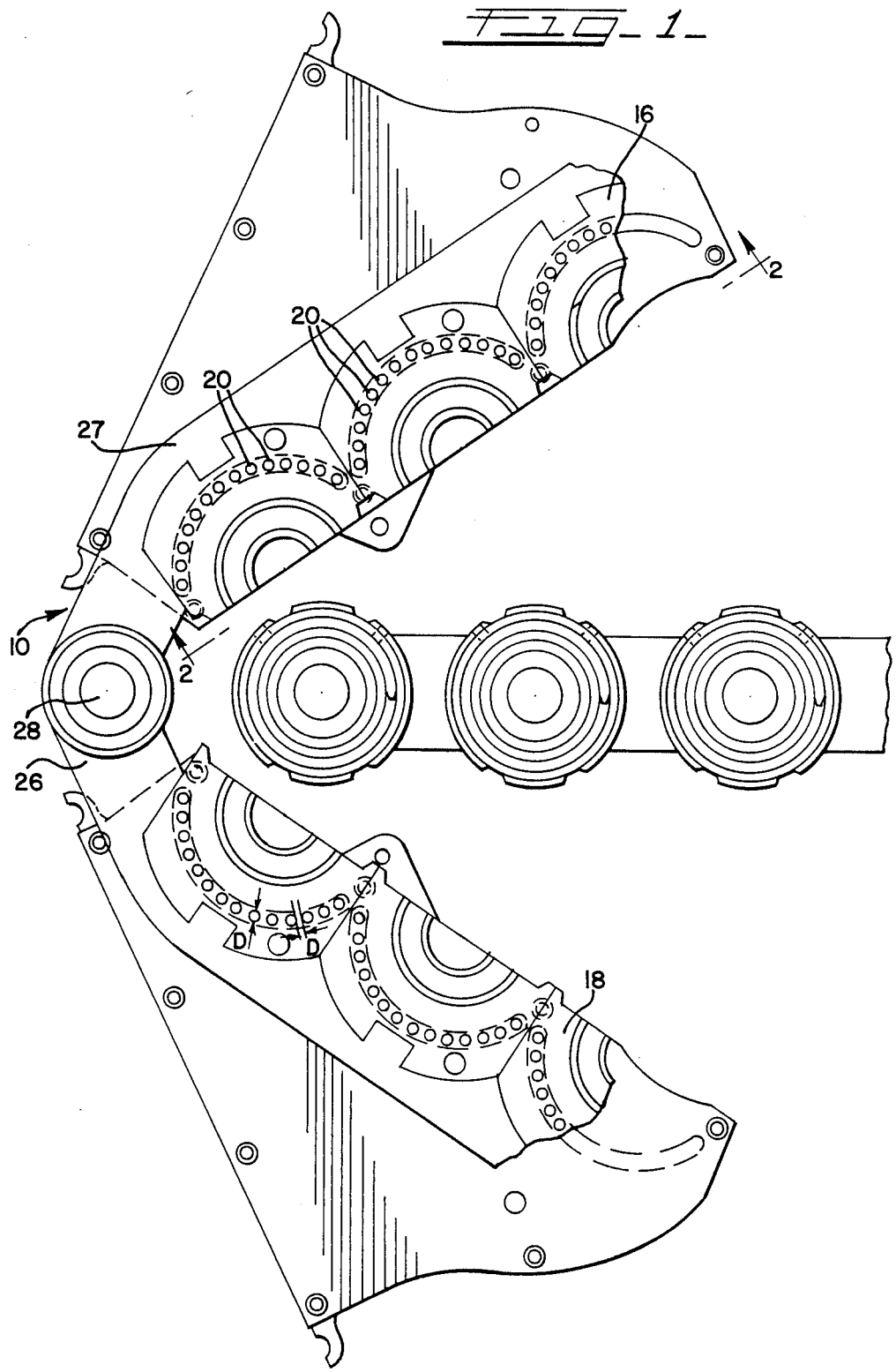

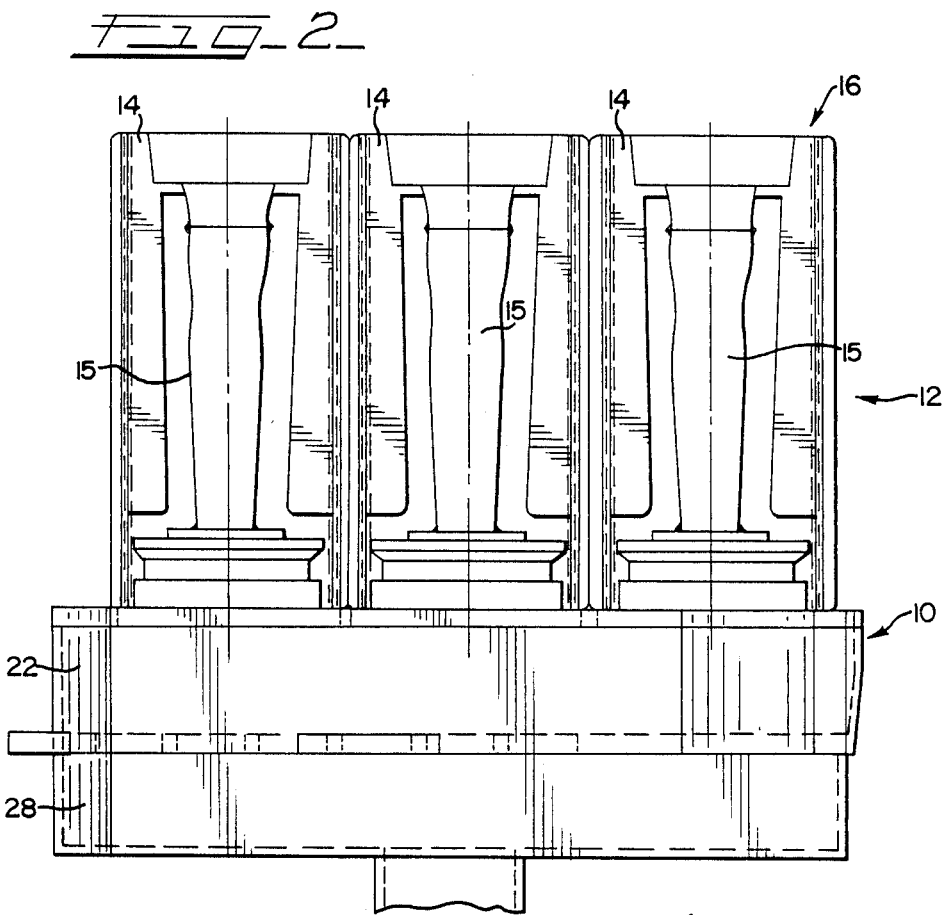
FIG_2_
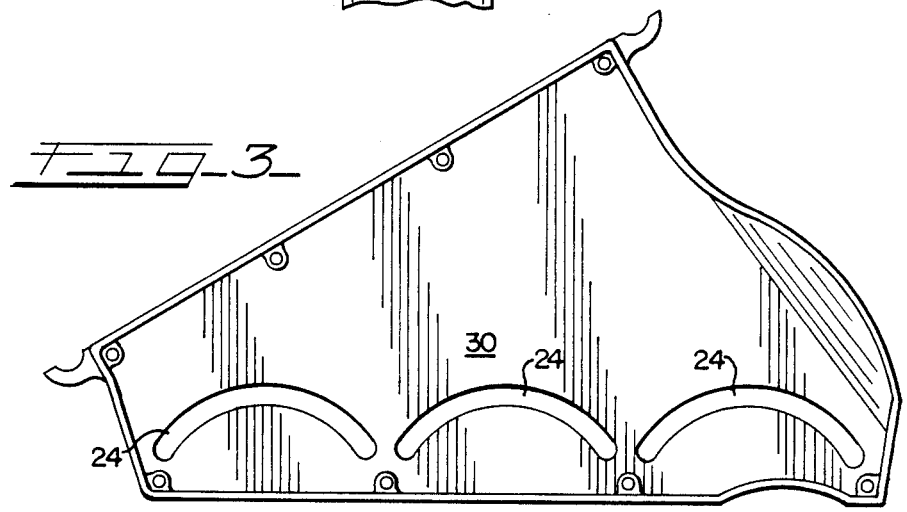
FIG_3_

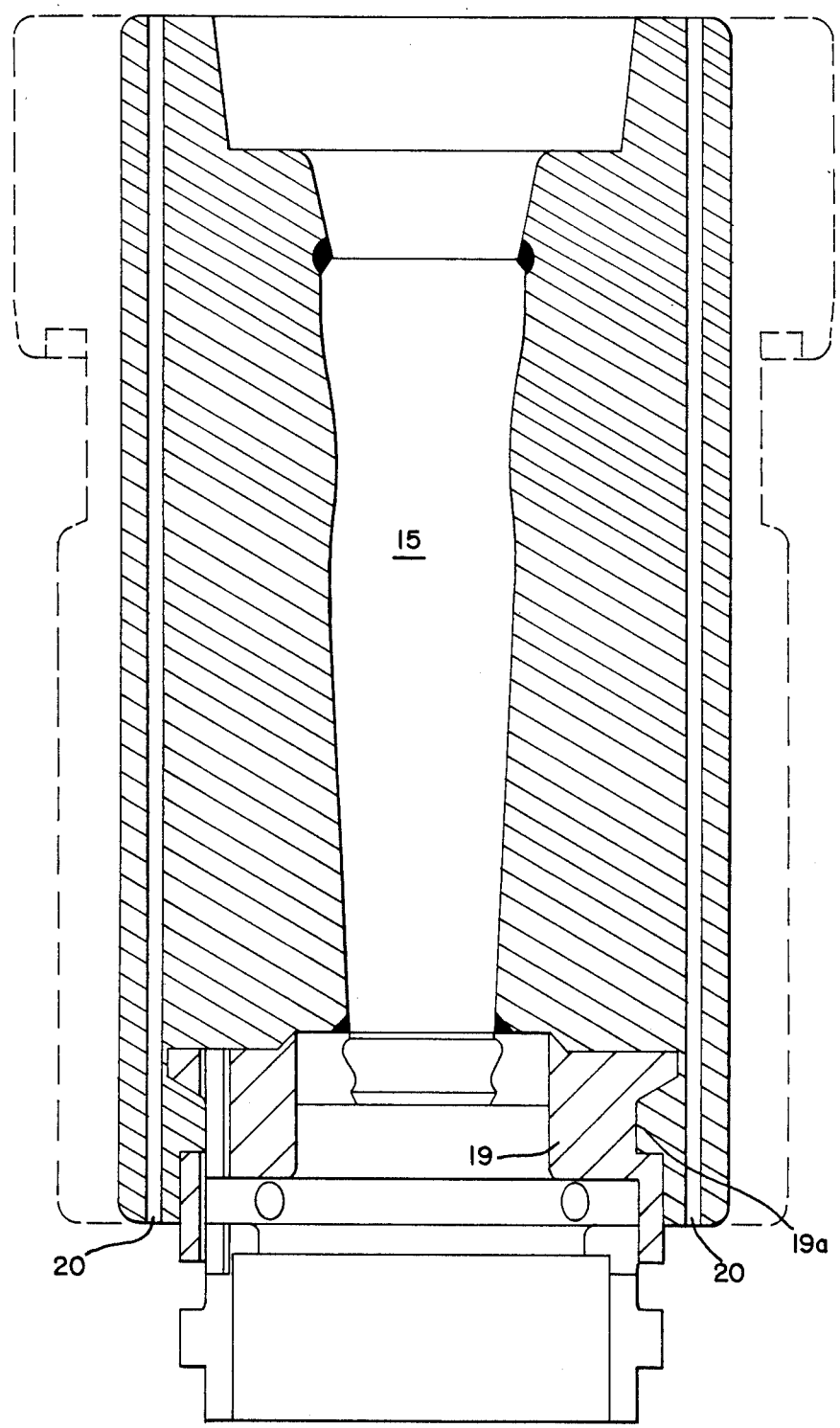
FIG_6

COOLING DEVICE FOR GLASS CONTAINER FORMING MACHINE

DESCRIPTION

1. Technical Field

This invention relates generally to an apparatus for the cooling of molds used to form glass containers. More particularly, it pertains to an apparatus which provides fewer restrictions in the flow path of air from an air source to that mold.

2. Background of the Invention

Glass containers, including glass bottles, are formed in a process that is well-known in the art. The various components of the glass are heated until they have melted. A gob of this melted glass is next formed into a parison in a so-called blanking or parison mold. The parison formed is moved from the blanking mold to a finishing or blow mold, where the finished bottle is shaped.

Mass production of glass bottles is generally carried out in a well-known IS (individual section) glass forming machine which has a plurality of glass forming means integrated into a single plural-section machine fed by a single source of molten glass. The sections are operated in synchronism in such relative phase relationship to permit the several sections to acquire gobs of molten glass in ordered sequence from the single source.

Thus, as one of the sections is receiving a gob from the feeding means, another section is delivering a finished article to an output conveyor and other sections are engaged in various forming steps between receipt of the gob and production of the finished article. The sequence of operation is controlled by a timing mechanism that may be either mechanically or electronically controlled. This timing mechanism sequentially initiates mechanical devices in a predetermined synchronized sequence through automatic control systems.

The IS machines have two molds in each individual mold section whereby a gob is received in a first mold, called a blanking or parison mold, for the initial process of forming a parison, followed by transfer of the parison to a second mold, called the blow or finishing mold, for blowing the parison to its final configuration. A transfer arm is pivoted between the blanking mold and the finishing mold and the parison is formed in an inverted position in the blanking mold and is transferred to the finishing mold in an upright position. This process is generally disclosed in U.S. Pat. No. 3,762,907, incorporated herein by reference.

The blanking and finishing molds are subjected to extremely high temperatures. For example, the blanking mold can reach temperatures as high as 1200° F. or more, while the finishing mold can reach temperatures as high as 1100° F. As a result, the heat that is transferred to these molds by the gob of molten glass and the parison during the molding process cannot be adequately dissipated into the ambient air by convection. Thus, a variety of auxiliary cooling means or methods have been utilized for these molds.

One such method relies upon air passing around the sides of the mold in a direction approximately perpendicular to the axis of the mold cavity. However, hangers and other hardware associated with the molding machine must be located along the path of and obstruct the flow of air so directed, lowering the cooling efficiency of this method.

Also, space restrictions around the molds and facility layout dictate that the cooling source cannot be located in close proximity to the molds. Thus, the cooling source, which is generally a cooling fan, is located in a separate room, usually below the molding machine, and isolated from the intense heat developed adjacent the molding machine.

Another cooling method, generally referred to as axial cooling, relies upon the passage of air through air passages formed in the mold itself. These passages and the air flow directed through them are parallel with the axis of the mold cavity, and are shown and described in the specification and FIG. 2 of U.S. Pat. No. 4,561,875, issued to Thomas V. Foster on Dec. 31, 4, 1985. Currently, however, the cooling air reaches these passages through a somewhat tortuous path. One example of this path is shown in the Foster patent.

Another example is shown in U.S. Pat. Nos. 4,750,929, issued to James A. Bolin on June 14, 1988, and 4,701,203, issued to Wilhelm Schneider on Oct. 20, 1987. In FIG. 3, of the '203 patent, which is assigned to Hermann Heye, Obernkirchen, Federal Republic of Germany, the flow of cooling air is depicted by solid arrows. That air moves through a mechanism such as a jaw which includes an articulated conduit component 48, and which cools upon the pivoting of a mold away from the glass container being formed.

The jaws for these devices must include conduits for the transport of the cooling air. Such conduit-containing jaws sell for four to five times the cost of conventional jaws used for a similar purpose in radial cooling systems. Moreover, the service life of these jaws is relatively short because of both their complexity and their large number of moving parts.

As may be seen in FIG. 3 of the '203 patent, the path of the cooling air in that apparatus changes directions at least four times en route to its air distributing device. These changes in direction are not gradual, but sudden, and at an angle of about ninety degrees. Upon each of these changes of direction, there is a significant drop in air pressure. Hence, cooling air at a relatively high pressure must be supplied to this mechanism. Obtaining cooling air at this high pressure requires relatively expensive, high capacity fans.

Other patents demonstrating means for cooling molds of this type or of general interest include U.S. Pat. Nos. 4,553,999, issued to Michael J. Ziegler et al. on Nov. 19, 1985; 4,629,488, issued to Wilbur O. Doud et al. on Dec. 16, 1986; 4,659,357, issued to Doud on Apr. 27, 1987; 4,676,573, 4,579,576 and 4,578,104, all issued to Stanley P. Jones on Apr. 14, 1987, Apr. 1, 1986, and Mar. 25, 1986, respectively; 4,690,703, issued to Constantine W. Kulig on Sep. 1, 1987; 4,701,202 and 4,657,574, issued to Foster on Oct. 20, 1987, and Apr. 14, 1987, respectively; 4,490,164, issued to Hermann H. Nebelung et al. on Dec. 25, 1984; and 4,668,269, issued to Rolando Cantu-Garcia et al. on May 26, 1987.

SUMMARY OF THE INVENTION

According to the primary aspect of the present invention, a cooling system for a molding machine that forms hollow articles from a molten material includes a cooling source that supplies pressurized cooling fluid directly to a forming mold without any significant pressure loss between the source and the molds to maximize the cooling effect.

More specifically, the cooling mechanism for a machine for molding glass objects from molten glass includes a mold having a plurality of cooling passages and a fixed plenum adjacent the mold that has an exit slot at its top for the passage of air from that plenum into the cooling passages of that mold. Pivot means are provided for pivoting the mold from closed position where the mold defines an article cavity to a second, open position away from the article to be molded. In this second position, one end of the cooling passages are in registry with the slot in the plenum to provide unobstructed passage of air from the plenum through the cooling passages. The cooling passages extend throughout the axial dimension of the mold and, thus, provide cooling of the separate neck finish ring that is also used to transport the finished parison out of the blank mold.

In a most preferred embodiment of the present invention, the passages are arranged in an arcuate array, the slots have a corresponding arcuate shape. Preferably the molds are formed in mold halves supported on pivoted arms and each arm supports a plurality of mold halves. In this preferred embodiment, the plenums are divided into chamber segments equal in number to the mold halves with each chamber segment having an arcuate exit slot.

An object of the invention is a mechanism which provides a substantially unrestricted, straight path for cooling air from an air supply source to a mold.

BRIEF DESCRIPTION OF THE DRAWINGS

FIG. 1 is a plan view of a parison mold incorporating the air cooling mechanism in accordance with the present invention, and showing the mold halves of three molds pivoted away from each other and into a position above the plenum cover;

FIG. 2 is a side view of the mold halves of the three molds of FIG. 1, taken along lines 2—2 of that FIG. 1, and also showing the plenum and its adjacent air supply means;

FIG. 3 is a top view of the plenum cover;

FIG. 6 is a side view of one of the three mold halves shown in the upper portion of FIG. 2, and showing parison as it is being formed.

DETAILED DESCRIPTION OF THE PREFERRED EMBODIMENT

Figure 4:
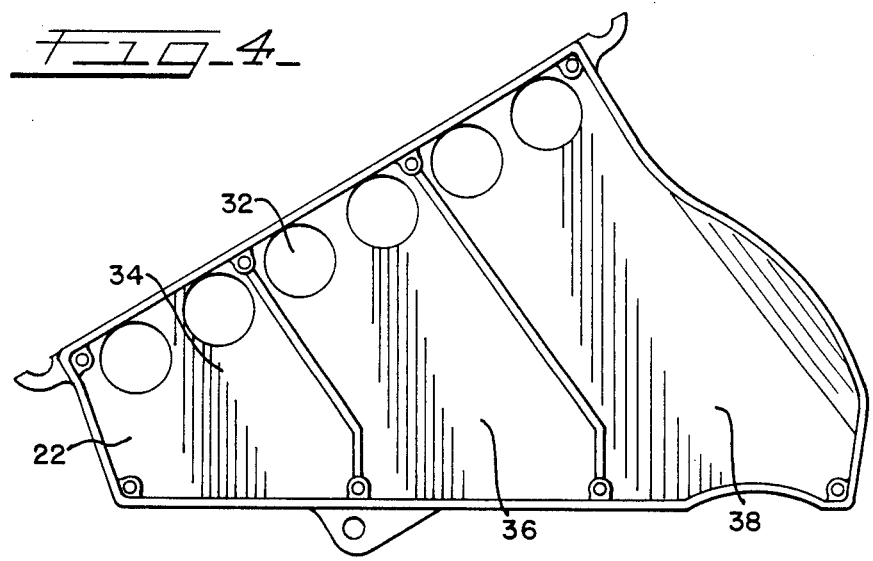
FIG. 4 is a top view of one embodiment of the plenum, with the plenum cover removed.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to embodiments illustrated.

Referring now to the figures, the present invention is an air cooling mechanism 10 for a conventional IS machine 12 for molding glass objects from molten glass. The mechanism and the relevant portion of the IS machine are generally shown in FIGS. 1 and 2. The mechanism and the IS machine include a plurality of blanking molds 14, and each of those molds have a plurality of air passages 20. Although the present embodiment contemplates the use of a blanking mold 14, where the parison 15 rather than the finished product is molded, it is contemplated that the present invention may also be advantageously used with a finishing mold.

Each blanking mold comprises two mold halves 16 and 18. Because the mold halves and their function in relation to the present invention are identical, the mold halves 16 and 18 of only one of the molds 14 will be referred to in this discussion.

Each of these mold halves are mounted on a mechanical means 26 for moving them alternatively into engagement and away from each other. When the mold halves 16 and 18 are closed or in engagement, they together facilitate formation of the parison 15. When the mold halves 16 and 18 are drawn away from each other or opened, the parison 15 is released for transport to the finishing mold (not shown). As may be best seen in FIG. 6, a split neck ring portion 19 of the blanking mold 14 is included for shaping the finish or threaded portion of the parison 15. The neck ring portion 19 is held in the mold halves 14 and 18 by a dove-tail connection 19a and is used as part of the transfer mechanism for transferring the finished parison into the finishing mold, as is well known in the art.

Air enters into the passage 20 of the mold 14 through its bottom, and particularly adjacent the split neck ring portion 19. As a result of the relatively straight and smooth flow path of the cooling air to the mold passages 20, the pressure of that air does not drop significantly, and efficient cooling of the neck area and the entire parison 15 is provided.

As may be seen in FIG. 1, several of these blanking molds 14 are typically arranged in close proximity to each other. FIG. 1 shows three molds 14 adjacent to each other. In fact, current technology could be up to four of these molds 14 mounted in contiguous manner of FIG. 1. However additional molds 14 could be possible. Each of these blanking molds 14 may be secured to the mechanism 26 for moving the mold halves 16 and 18 from their engaged position (not shown) to their spaced-apart positions (FIG. 1). The support mechanism 26 includes a hanger arm 27 pivoted on a fixed pivot pin 28 and movable between opened and closed positions by a suitable drive means (not shown).

Each blanking mold 14 is made of a high heat conductivity material, and is generally a metallic substance. The molten glass which is poured into the blanking mold 14 is at an extremely high temperature. In addition, each individual blanking mold forms up to twenty or more of these parisons per minute. As a result of these combined factors, the typical blanking 14 and finishing molds reach temperatures as high as 1200° and 1100° F., respectively. Without auxiliary cooling aids, the molds 14 could not possibly disperse this heat through the ambient air. It is for this reason that an air cooling mechanism in accordance with the present invention is necessary.

FIGS. 1 and 6 show side or sectional views of one of the two mold halves 16 and 18 of one of the outermost mold of FIG. 1. Air passages 20 are formed along and traverse the entire length of these mold halves 16 and 18. To ensure adequate heat transfer from these mold halves 16 and 18, the air passages 20 should be spaced a certain distance from each other. In the embodiment of FIG. 1, the axial centers of air passages 20 are disposed along a radial arc.

The axial cooling hole centers are spaced on radial centers generally equidistant from the mold cavity.

Figure 5:
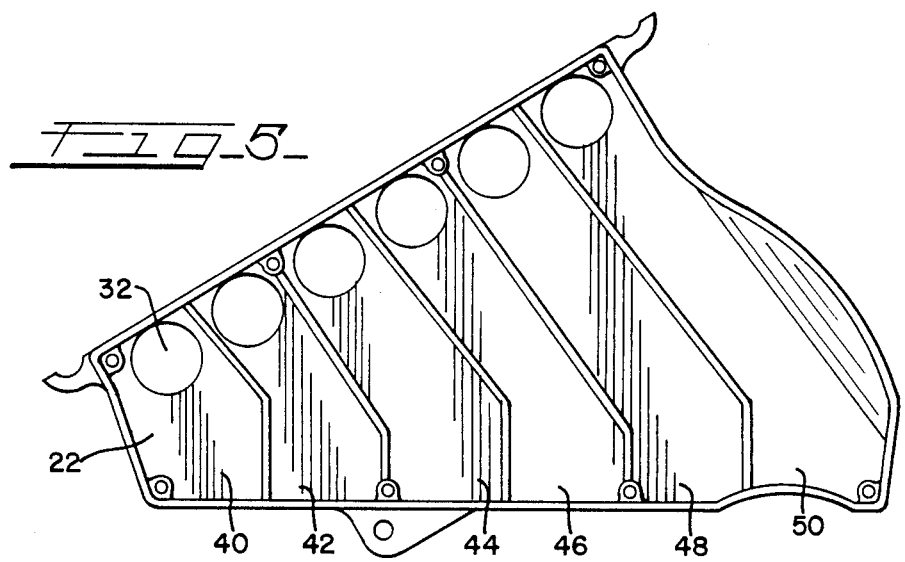
FIG. 5 is a top view of another embodiment of the plenum, with the plenum cover removed.

According to a primary aspect of the present invention, the cooling source includes a fixed plenum 22 which has a substantially unrestricted supply of pressurized cooling fluid or air delivered from a source, such as a cooling fan (not shown). As may be seen in FIG. 3, this plenum 22 defines a pressure chamber which includes a plenum cover 30 having a plurality of slots 24. High pressure air enters this fixed plenum 22, and then moves towards this slot 24. This slot 24 serves as a discharge port for the air from the fixed plenum 22, and facilitates its movement to the air passages 20 of the mold halves 16 and 18. Air supply means 28 (FIG. 2) provides pressurized air to the plenum 22 through one of six ports 32 (FIGS. 4 and 5). Any type of regulating means (not shown) may be used to control the flow of air from supply means 28 to plenum 22, and may be controlled by the timing mechanism to minimize pressurized air loss.

As indicated above and as shown in FIG. 1, pivot means 26 are provided for pivoting the mold halves 16 and 18 from a first, closed position where the mold halves form a cavity for an article or parison 15 to be molded, to a second, open position away from the article to be molded. FIG. 1 shows these mold halves 16 and 18 in this second open position when the passages 20 are aligned with slots 24. In this position, the air enters the air passages 20 of the mold and cools the mold halves 16 and 18 only when those mold halves are in this second position.

In this second position, as may also be seen in this FIG. 1, one of the ends of each of a group of air passages 20 in each of the mold halves is in registry with a slot 24 in the plenum cover 30. When the air passages 20 and the slot 24 are in registry, air moves from the ports 32 into the fixed plenum 22 and upwardly towards the plenum cover 30. The air exits the plenum 22 through the slot 24, and is then discharges into the air passages 20 of the corresponding mold 14.

In a most preferred embodiment of the present invention, as shown in FIGS. 1 and 3, the slots 24 have an arcuate shape. In this way, each slot 24 overlies one end of each of the air passages 20 when that slot 24 and its respective group of air passages 20 are in registry.

In one embodiment of the present invention, as shown in FIG. 4, the plenum is divided into a plurality of channels 34, 36 and 38. Each of these channels terminates at a point defined by only one exit slot 24. Cooling air passes through each of the channels 34, 36 and 38 towards one of the slots 24 at one end of the channels for discharge into the air passages 20.

In this embodiment, the amount of air delivered to each slot 24 can be regulated by throttle valves (not shown) in entrance ports 32.

In yet another embodiment of the invention, as shown in FIG. 5, the plenum is also divided into a plurality of channels 40, 42, 44, 46, 48 and 50. However, each slot is fed by two channels, rather than one. As in the embodiment of FIG. 4, cooling air in the embodiment of FIG. 5 passes through each adjacent pair of channels (for example, channels 40 and 42) and towards its corresponding slot 24 for discharge into the air passages. This latter embodiment acts as a means of throttling the volume of cooling air to given mold half. If a lesser volume of air is to be sent to a given mold half, the operator may close the port 32 leading to one of the two channels, for example channel 40, feeding each slot. With one port closed in this manner, the volume of air transported to the single slot 24 fed by channels 40 and 42 is halved.

As will be appreciated from the above description, the fixed plenums provide substantially unrestricted flow to the bottoms of the axial cooling openings without any significant pressure drops below the source pressure. Moreover, the openings 20 extend the entire length of the molds and therefore provide cooling of the neck ring 19 through conduction of the mold.

After the blanking mold opens, the neck ring is used to transport the parison to the finishing or below mold side of the machine where the neck ring is opened by a parallel parting of two halves and the parison is placed into the blow mold.

While the specific embodiments have been illustrated and described, numerous modifications come to mind without markedly departing from the spirit of the invention. The scope of protection is thus only intended to be limited by the scope of the accompanying claims.

We claim:

1. An air cooling mechanism for the blank mold-side of a machine for molding glass objects from molten glass, said mechanism comprising:
    a. a mold, said mold having a plurality of air passages therethrough;
    b. a plenum defining a pressure chamber, said plenum including a slot defining an exit for the passage of air from said plenum through said air passages of said mold;
    c. stationary air supply means for supplying pressurized air, and to which said plenum is fixed, and wherein said mold is spaced apart from and not in contact with said stationary air supply means; and
    d. pivot means for pivoting said mold from a first position where said mold engages an article to be molded, to a second position away from said article to be molded, and wherein the ends of said air passages are in registry with said slot to effect the passage of air from said plenum and through said air passages.

2. The cooling mechanism set forth in claim 1, wherein said slot is arcuate.

3. The cooling mechanism sent forth in claim 1, wherein said plenum is divided into a plurality of channels, each of said channels feeding one of said slots, and wherein cooling air passes through each of said channels and towards one of said slots at one end of said channels for discharge into said air passages.

4. The cooling mechanism set forth in claim 1, wherein said plenum is divided into a plurality of pairs of channels, each of said pairs of channels feeding one of said slots, the air in an adjacent pair of said channels discharging into one of said slots, and wherein cooling air passes through each adjacent pair of channels and towards its corresponding slot at one end of said pair of channels, for discharge into said air passages.

5. Blank mold-side apparatus for forming hollow articles from a molten material and including at least a pair of mold halves movable from a closed position defining a mold cavity to an open position where said mold halves are spaced from each other, each of said mold halves having a plurality of spaced axial cooling passages, the improvement comprising stationary means for supplying cooling fluid to said passages and including first and second plenums fixed to said stationary means and defining first and second chambers respectively aligned with said mold halves in said open position, cooling fluid supply means for delivering cooling fluid to said chambers, each of said chambers having an exit slot aligned with said cooling passages of a mold half in a second position to produce flow of cooling fluid through said passages and absorb heat from said mold half.

6. Apparatus as defined in claim 6, further including first and second hanger arms, respectively supporting said mold halves with means defining a fixed pivot axis for said hanger arms at one end thereof and means for pivoting said arms and mold halves between open and closed positions.

7. Apparatus as defined in claim 6, in which said cooling passages in each mold half form an arcuate pattern at one open end and said slots in each plenum conform to said arcuate pattern.

8. Apparatus as defined in Claim 7, further including a plurality of mold halves support on each hanger arm with each mold half having an arcuate array of axial cooling passages and in which said plenums each have arcuate slots respectively aligned with an array of axial cooling passages when said mold halves are in an open position.

9. Apparatus as defined in Claim 9, in which said fixed pivot axis extends vertically and said axial cooling passages extend vertically through said mold halves with said plenums fixed below said mold halves.

10. Apparatus as defined in Claim 10, further including a neck forming element supported by said mold halves adjacent a lower end of said cavity with said cooling passage extending through a portion of said mold halves adjacent said forming element to provide cooling for said forming element.

11. A method of cooling a machine for molding glass objects from molten glass with a movable, blank mold-side glass mold having a plurality of air passages, comprising:
 a. pivoting a mold from a first closed position where said mold defines a cavity for an article to be molded, to a second open position away from said article to be molded, and wherein the ends of said air passages are in registry in a fixed array;
 b. positioning a plenum in proximity to said mold and having a fixed slot alignable with said array of air passages when said mold is in said second, open position;
 c. transporting pressurized air from a stationary air supply to which said plenum is fixed and said fixed slot in registry with said air passages when said mold is in said second position, to thereby effect the passage of air from said fixed plenum through said air passages.

* * * * *

UNITED STATES PATENT AND TRADEMARK OFFICE
CERTIFICATE OF CORRECTION

PATENT NO. : 4,983,203
DATED : January 8, 1991
INVENTOR(S) : Erb et al.

It is certified that error appears in the above-identified patent and that said Letters Patent is hereby corrected as shown below:

Column 2, Line 16, delete "4,".

Column 3, Line 7, after "from" insert --a--.

Column 3, Line 46, after "showing" insert --a--.

Column 5, Line 35, delete "discharges" and insert --discharged--.

Column 6, Claim 3, Line 41, delete "sent" and insert --set--.

Column 7, Claim 6, Line 4, delete "6" and insert --5--.

Column 7, Claim 9, Line 21, delete "9" and insert --8--.

Column 8, Claim 10, Line 1, delete "10" and insert --9--.

Signed and Sealed this

Twenty-first Day of July, 1992

Attest:

DOUGLAS B. COMER

*Attesting Officer*  *Acting Commissioner of Patents and Trademarks*